United States Patent [19]

Warner, Jr. et al.

[11] Patent Number: 5,836,650
[45] Date of Patent: Nov. 17, 1998

[54] CAR SEAT WITH HEIGHT ADJUSTMENT MECHANISM

[75] Inventors: Robert John Warner, Jr., Stow; Michael Carnahan, Bedford, both of Ohio

[73] Assignee: Century Products Company, Macedonia, Ohio

[21] Appl. No.: 874,311

[22] Filed: Jun. 13, 1997

[51] Int. Cl.⁶ .............................. B60N 2/26; A47D 1/10
[52] U.S. Cl. .................... 297/256.11; 297/250.1; 297/256.13
[58] Field of Search .................. 297/256.11, 256.13, 297/250.1

[56] References Cited

U.S. PATENT DOCUMENTS

| 1,853,848 | 4/1932  | Cross ............................ 297/256.11 X |
| 3,157,432 | 11/1964 | Watkins ........................ 297/256.11 X |
| 4,047,755 | 9/1977  | McDonald ..................... 297/256.13 X |
| 4,376,551 | 3/1983  | Cone ................................ 297/256.13 |
| 4,733,909 | 3/1988  | Single, II et al. ............... 297/256.13 |
| 4,738,489 | 4/1988  | Wise et al. ..................... 297/250.1 X |
| 4,798,412 | 1/1989  | Kohus et al. ..................... 297/256.1 |
| 4,854,638 | 8/1989  | Marcus et al. .................. 297/256.11 |
| 5,031,960 | 7/1991  | Day ............................... 297/256.11 X |
| 5,052,750 | 10/1991 | Takahashi et al. .............. 297/250.1 |
| 5,058,283 | 10/1991 | Wise et al. . |
| 5,181,761 | 1/1993  | Meeker ......................... 297/256.13 X |
| 5,335,964 | 8/1994  | Sedlack et al. ................. 297/256.13 |
| 5,609,393 | 3/1997  | Meeker et al. ................. 297/256.13 |

*Primary Examiner*—Jose V. Chen
*Assistant Examiner*—Rodney B. White
*Attorney, Agent, or Firm*—Knobbe, Martens, Olson & Bear LLP

[57] ABSTRACT

An adjustment mechanism for a car seat provides multiple vertical locking positions for adjusting the attitude of a seat with respect to an automobile seat cushion and back. The car seat has a base with forward and rear support walls each having a key way matching the profile of the stem portion of a locking plunger. The plunger has a forward handle portion and a pair of shoulder portions extending to the rear of the plunger which engage mating recesses in a key way formed in an adjustable support member. The adjustable support member is slidably arranged between the forward and rear support walls of the base. The plunger is spring biased by a spring mounted in a spring aperture formed in the rear of the plunger stem. The relative positions of the support member and the car seat base are adjusted by withdrawing the plunger until the shoulder portions clear the support member key way, adjusting the position of the support member with respect to the car seat base and releasing the plunger to enable the spring to force the plunger rearwardly into the support member key way.

18 Claims, 6 Drawing Sheets

CAR SEAT WITH HEIGHT ADJUSTMENT MECHANISM

BACKGROUND OF THE INVENTION

This invention relates to car seats in general. More particularly, this invention relates to a car seat having a height adjustment mechanism.

Car seats are known and widely used to provide safe passage for an infant when riding in an automobile. Some car seats are stand-alone devices, while others have bases for use in a vehicle and are removable for use as a carrier or in a baby stroller. Representative examples of car seats are disclosed in U.S. Pat. Nos. 4,738,489, 5,052,750 and 5,058,283, the disclosures of which are hereby incorporated by reference. A typical car seat includes a main body usually in the form of a molded plastic shell providing the seating area, and a base, which is either integrally molded with the main body or a separate member detachably secured to the main body. The car seat is typically installed in an automobile by placing the base on the automobile seat cushion and back and securing the car seat to the automobile seat using appropriate fasteners, such as an automobile safety belt.

One problem encountered with the use of car seats is that of arranging the car seat at the proper riding attitude. Typically, this is usually done by placing a rolled up blanket or some other maneuverable article underneath the car seat base and manipulating the blanket until the proper attitude is achieved. This practice is, at best, inconvenient and, at worst, frustrating to the user.

While car seats have been designed with position adjustment mechanisms, these mechanisms are relatively complicated and expensive. In addition, such mechanisms are incompatible with stand-alone one-piece car seats.

SUMMARY OF THE INVENTION

The invention comprises a car seat with a position adjustment mechanism which is relatively simple in construction and operation, which adds relatively little cost to the article and which is compatible with both infant car seats as well as convertible car seats.

The position adjustment mechanism includes a vertically movable support member for engagement with a portion of the car seat at at least two locations to permit adjustment of the vertical location of the portion of the car seat relative to the car seat cushion, and means for releasably securing the support member to the portion of the car seat.

The means for releasably securing the support member to the portion of the car seat includes a spring biased plunger for engagement with one of the at least two locations to retain the seat in a desired vertical location relative to the vehicle seat cushion.

The portion of the car seat preferably includes a spaced pair of support walls having a key way, and a support member slidably arranged between the spaced pair of support walls. The support member further preferably includes a key way having a plurality of pairs of vertically arranged and laterally spaced support rail segments which provide the at least two adjustment locations.

The spring biased plunger preferably includes a flanking pair of shoulder portions engagable with the plurality of pairs of laterally spaced support rail segments. The plunger also preferably includes a forward portion providing a handle, and a rear portion comprising a central stem and a pair of flanking shoulder portions. The plunger further includes a central guide vane extending rearwardly of the forward portion, and a second vane aligned with the central guide vane and extending rearwardly thereof. The central stem preferably includes an aperture formed therein for enabling the bias spring to be carried by the plunger, the aperture defining a pair of spring retaining tabs.

For a fuller understanding of the nature and advantages of the invention, reference should be had to the ensuing detailed description taken in conjunction with the accompanying drawings.

DETAILED DESCRIPTION OF THE PREFERRED EMBODIMENT

Figure 1:
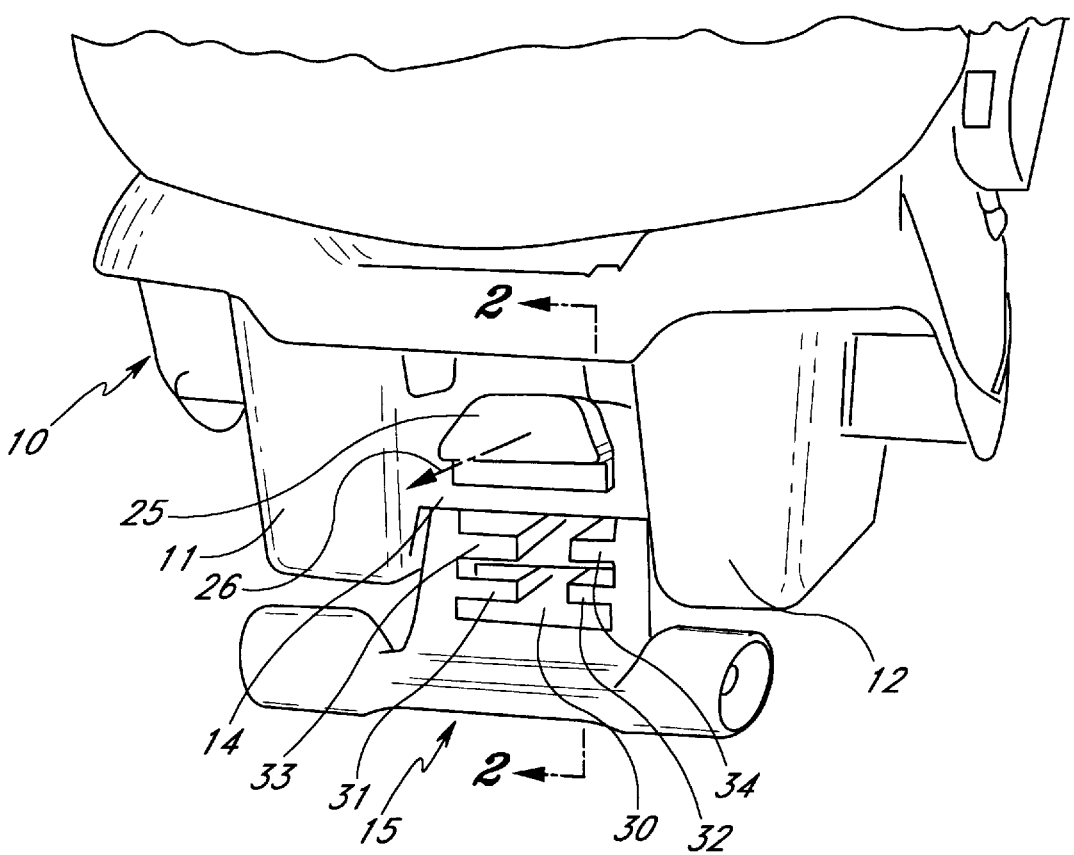
FIG. 1 is a partial perspective view of a preferred embodiment of the invention illustrating the position adjustment mechanism.

Turning now to the drawings, FIG. 1 is a partial perspective view illustrating the preferred embodiment of the invention. As seen in this figure, a car seat base generally designated with numeral 10 has a pair of downwardly extending support portions 11, 12 flanking a central exterior support wall 14. A separate support member generally designated with reference numeral 15 is adjustably secured to base 10 by means of a locking plunger 25. As described in detail below, locking plunger 25 is normally biased by a spring to a fully engaged position illustrated in FIG. 1 in which support member 15 and base 10 are maintained in relatively fixed positions. To change the relative positioning between base 10 and support member 15, locking plunger 25 is manipulated outwardly of base 10 in the direction of arrow 26 to a release position in which the relative positions of base 10 and support member 15 can be changed. The structure for providing this operation will now be described.

Figure 2:
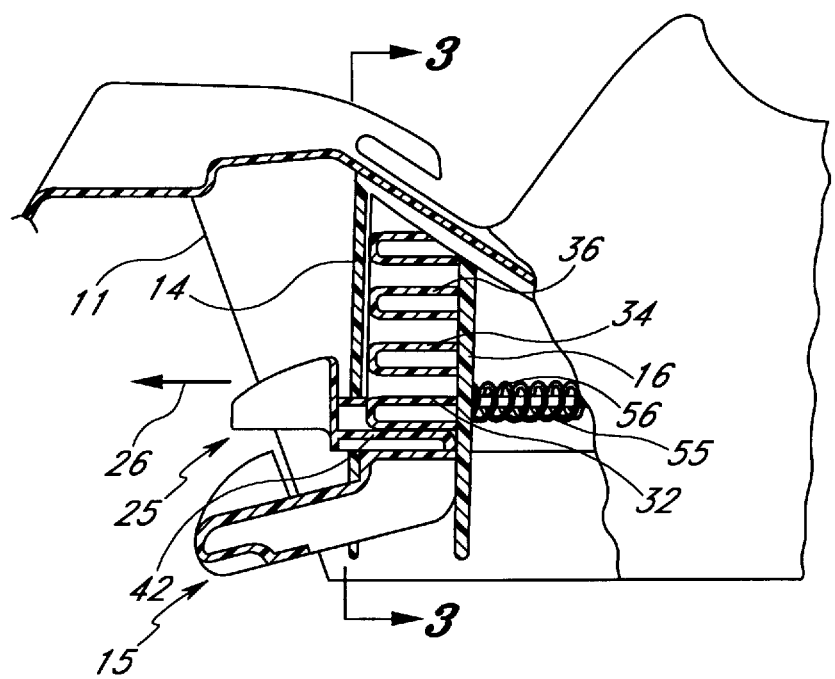
FIG. 2 is a side sectional view partially broken away taken along lines 2—2 of FIG. 1 illustrating the operation of the invention of FIG. 1.
Figure 3:
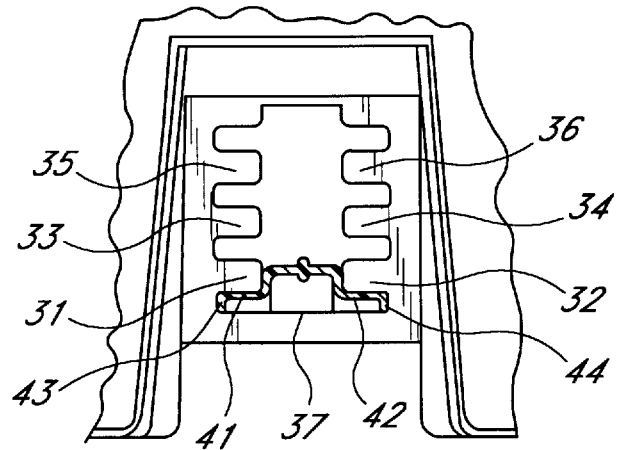
FIG. 3 is a detail view partially in section showing the relative positions of the locking plunger and the plunger guide in one vertical adjustment position.

With reference to FIGS. 1–3, support member 15 is provided with a centrally located compound plunger key way generally designated with reference numeral 30. Key way 30 includes a plurality of pairs of laterally spaced support rail segments, such as segments 31, 32, 33 and 34 shown in FIG. 1. The separation distance between facing inner edges of each pair of support segments, such as segments 31, 32 is sufficiently great to provide clearance for a stem portion of plunger 25 in order to permit the support member to be manipulated vertically upwardly and downwardly when withdrawn outwardly of body 10 in the direction of arrow 26. As best shown in FIGS. 2 and 3, when locking plunger 25 is in the fully engaged position illustrated in section in FIG. 2, plunger 25 has a pair of flanking shoulder portions 41, 42 and downwardly depending outer shoulder walls 43, 44. The upper surfaces of shoulder portions 41, 42 are contoured to bear against the under surfaces of support rail segments 31–36 in the manner depicted in FIG. 3, while the outer shoulder walls 43, 44 rest on the support surfaces of key way 30. In FIG. 3, plunger 25 is depicted in the lowermost position in which the lower support edges of outer shoulder walls 43, 44 rest on a substantially planar bottom surface 37 of key way 30. In the remaining vertical positions (three illustrated), the lower edges of outer shoulder walls 43, 44 rest on the upper support surfaces of the support rail segments 31–36.

Figure 4:
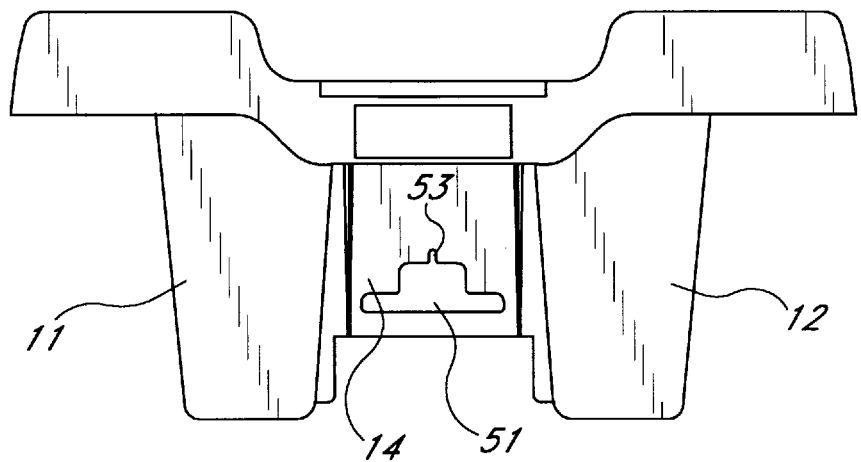
FIG. 4 is a front elevational view showing the forward plunger support wall formed in the base.
Figure 5:
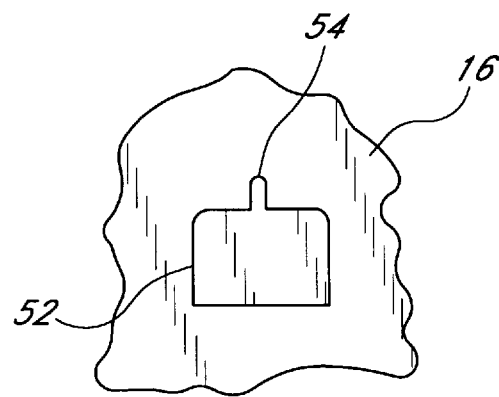
FIG. 5 is a partial elevational view showing the rear plunger support wall formed in the base.
Figure 6:
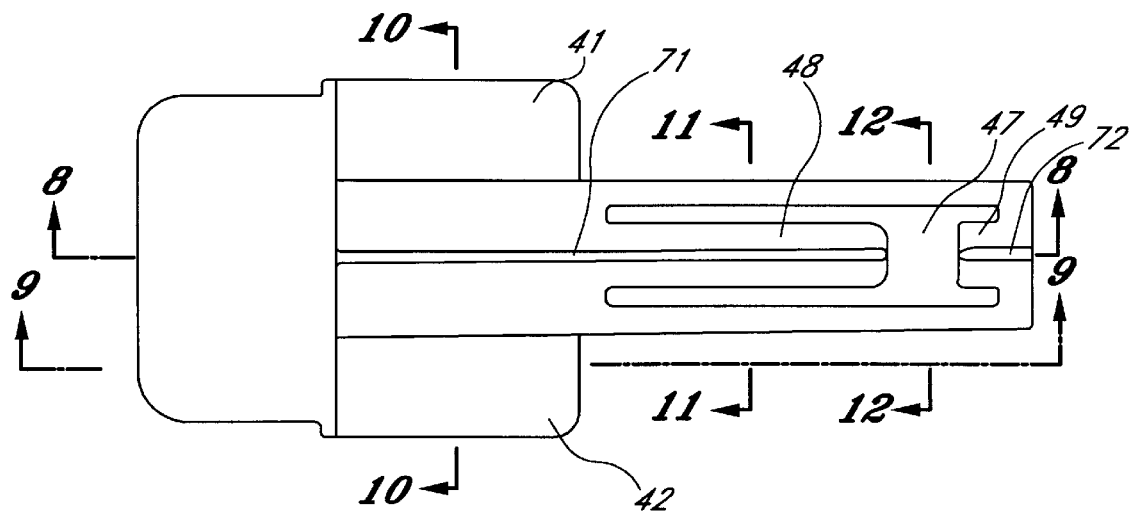
FIG. 6 is a top plan view of the locking plunger.
Figure 7:
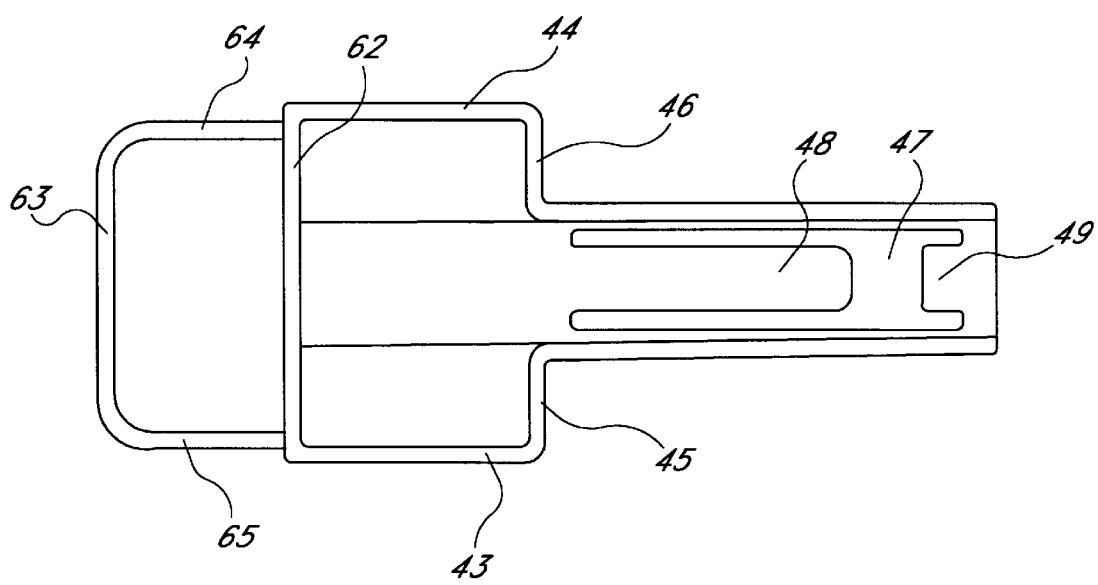
FIG. 7 is a bottom plan view of the locking plunger.
Figure 8:
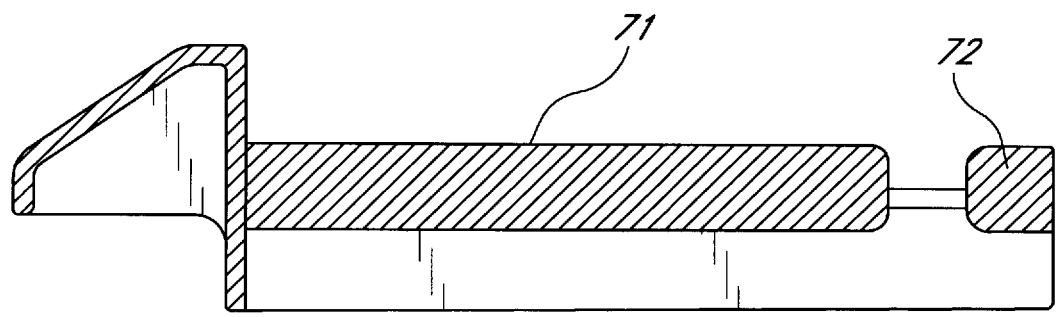
FIGS. 8 and 9 are side sectional views taken along lines 8—8 and 9—9, respectively, of FIG. 6.
Figure 9:
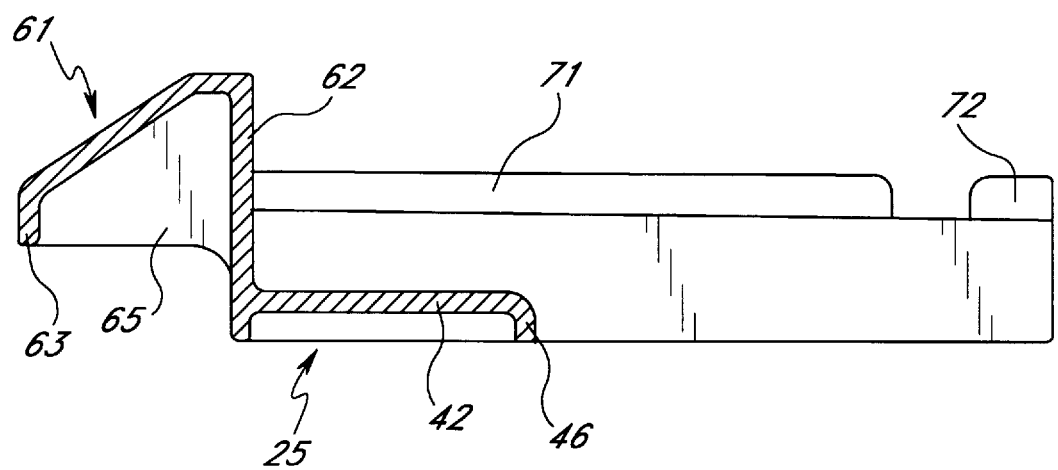
Figure 10:
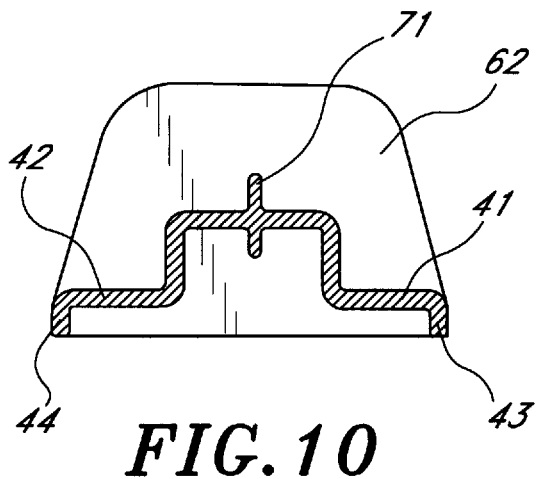
FIGS. 10–12 are cross-sectional views of the locking plunger taken along lines 10—10 through 12—12, respectively, of FIG. 6.
Figure 11:
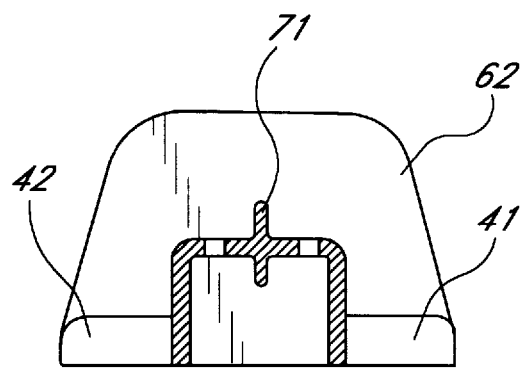
Figure 12:
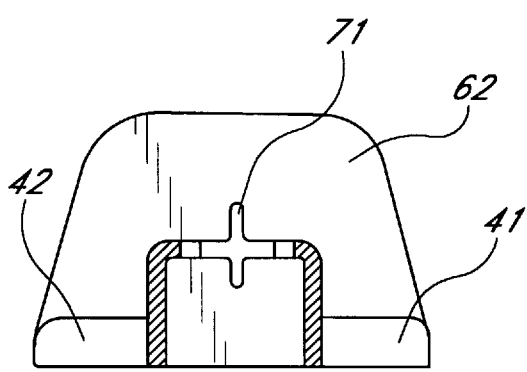
Figure 13:
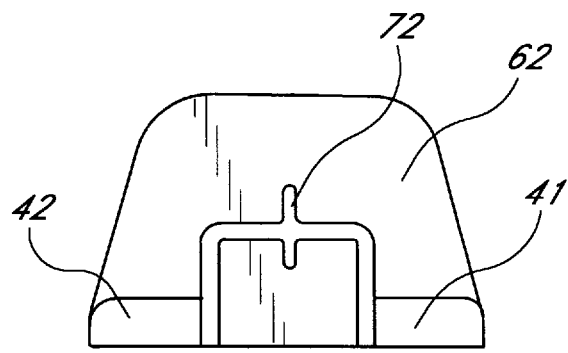
FIG. 13 is an rear end elevational view of the locking plunger.

Again with reference to FIG. 2, the key way portion of support member 15 is slidably arranged between exterior support wall 14 and an interior support wall 16. The profile of exterior support wall 14 is illustrated in FIG. 4; while the profile of a key way portion of interior support wall 16 is illustrated in FIG. 5. As seen in FIG. 4, key way profile 51 of exterior support wall 14 matches the cross-sectional profile of the shoulder section of locking plunger 25; while the key way profile 52 of interior support wall 16 matches the profile of a rear portion of plunger 25 described more fully below. As plunger 25 is withdrawn outwardly (to the left in FIG. 2), the shoulder portions 41, 42 slide along the under surface of the super-adjacent support rail segments 31–36 until the shoulder portions 41, 42 clear these surfaces. As plunger 25 is withdrawn, a spring 55 located in a rear portion of plunger 25 and having a first end 56 bearing against the inner wall surface of inner support wall 16 is compressed. With plunger 25 sufficiently withdrawn, support member 15 can be maneuvered vertically in either the upward or downward direction to change the relative vertical positions between base 10 and support member 15. When the correct position is achieved, plunger 25 is released and is forced rearwardly into key way 30 by the force of spring 55. In this manner, the relative positional attitude of the base 10 can be changed in a vertical direction in a relatively simple manner.

FIGS. 6–9 illustrate the configuration of plunger 25. As seen in these figures, plunger 25 includes a forward portion 61 with a vertically extending rear wall 62 providing a rearward limit stop for plunger 25. Forward portion 61 also includes a hollow defined by wall 62, forward wall 63 and side walls 64, 65 to facilitate manipulation of the plunger in the key way 30. Shoulder portions 41, 42 extend rearwardly of wall 62 and terminate at the rear thereof in a downwardly depending wall portion 45, 46.

Also extending rearwardly of wall 62 is a stem portion having a forward guide vane 71 and a rear guide vane 72. Guide vanes 71, 72 interact with notch portions 53, 54, respectively, of support walls 14 and 16 (see FIGS. 4 and 5). A generally H-shaped aperture 47 is formed in the stem portion of plunger 25 in order to accommodate bias spring 55 and retain spring 55 in plunger 25.

To assemble the device, support member 15 is inserted from below base 10 with the portion of support member 15 providing key way 30 between support walls 14 and 16. Plunger 25 is next inserted from the front of base 10 and pushed backwardly through walls 14 and 16. Spring 55 is then inserted into spring aperture 47 and maneuvered about portions 48 and 49 of the stem portion of plunger 25. The main body of spring 55 is received about retaining portion 48; while the rear end of spring 55 is captured by support 49.

As will now be apparent, the invention provides a relatively inexpensive car seat adjustment mechanism which is easy to assemble and relatively simple to use. Support member 15 and plunger 25 are preferably fabricated from molded plastic materials. In the preferred embodiment illustrated, the co-acting portions of seat base 10 are similarly fabricated from a suitable molded plastic material.

While the above provides a full and complete disclosure of the preferred embodiments of the invention, various modifications, alternate constructions and equivalents will occur to those skilled in the art. For example, while key way 30 has been illustrated as providing four separate adjusting positions, more or less positions may be provided by increasing or decreasing the number of support rails. Therefore, the above should not be construed as limiting the invention, which is defined by the appended claims.

What is claimed is:

1. A car seat for installation on a seat cushion of a vehicle, via a seat belt associated with said vehicle, the car seat comprising a main body defining a seating area, a seat base supporting the main body, a vertically movable support member for engagement with a portion of said seat base at at least two locations to permit vertical adjustment of said portion of said seat base relative to said vehicle seat cushion, the support member providing support between said seat base and said vehicle seat cushion, and means for releasably securing said support member to said portion of said seat base.

2. The car seat of claim 1 wherein said means for releasably securing includes a spring-biased plunger for engagement with one of said at least two locations to retain said portion of said seat base in a desired vertical location relative to said vehicle seat cushion.

3. The car seat of claim 2 wherein said plunger includes a forward portion providing a handle, and a rear portion comprising a central stem and a pair of flanking shoulder portions.

4. The car seat of claim 3 wherein said central stem has an aperture formed therein for enabling a spring to be carried by said plunger.

5. The car seat of claim 4 wherein said aperture defines a pair of spring retaining tabs.

6. The car seat of claim 1 wherein said portion of said seat base includes a spaced pair of support walls having a key way; and wherein said support member is slidably arranged between said spaced pair of support walls.

7. The car seat of claim 1 wherein said support member includes a key way having a plurality of pairs of laterally spaced support rail segments providing said at least two locations.

8. The car seat of claim 7 wherein said means for releasably securing includes a spring biased plunger having a flanking pair of shoulder portions engagable with said plurality of pairs of laterally spaced support rail segments.

9. A car seat for installation on a seat cushion of a vehicle via a seatbelt associated with said vehicle, comprising means for adjusting the position of a base of said car seat relative to said vehicle seat, said adjusting means including a vertically movable support member for engagement with a portion of said car seat at at least two locations to permit vertical adjustment of said portion of said car seat relative to said vehicle seat cushion, and means for releasably securing said support member to said portion of said car seat, wherein said means for releasably securing includes a spring-biased plunger for engagement with one of said at least two locations to retain said seat in a desired vertical location relative to said vehicle seat cushion, wherein said plunger includes a forward portion providing a handle, and a rear portion comprising a central stem and pair of flanking shoulder portions, and, wherein said plunger further includes a central guide vane extending rearwardly of said forward portion.

10. The car seat of claim 9 wherein said plunger further includes a second vane aligned with said central guide vane and extending rearwardly thereof.

11. A car seat for restraining a child on a vehicle seat cushion, the car seat comprising:

a seat portion for receiving the child;

a base portion attached to the seat portion and positioned between the seat portion and the vehicle seat cushion when the vehicle is in a mounted position on the vehicle seat cushion;

a vertically moveable support member extending from the base portion, the support member including a plurality of vertically spaced engaging structures; and a horizontally moveable plunger attached to the base portion, the plunger having mating surfaces configured to releasably engage with each of the vertically spaced engaging structures.

12. The car seat of claim 11, wherein the support member extends between the base portion and the vehicle seat in the mounted position.

13. The car seat of claim 12, wherein the support member extends from a lower front end of the base portion.

14. The car seat of claim 13, wherein the lower front end of the base portion includes a spaced pair of support walls having a key way; and wherein the support member is slidably arranged between said spaced pair of support walls.

15. The car seat of claim 11, wherein the plunger is spring-biased.

16. The car seat of claim 11, wherein each of the plurality of vertically spaced engaging structures comprises a pair of horizontally spaced support rail segments.

17. The car seat of claim 16, wherein the plunger comprises a forward portion including the mating surfaces and a stem portion extending rearwardly of said forward portion, the stem portion slidingly arranged in a vertical stem channel defined between the pairs of support rail segments.

18. The car seat of claim 11, wherein the plunger includes a handle portion, a stem extending rearwardly of the handle portion, and a pair of flanking shoulder portions flanking the central stem and including the mating surfaces, the stem having a central guide vane extending rearwardly of the handle portion.

* * * * *